US012619093B2

(12) United States Patent
Drexler

(10) Patent No.: US 12,619,093 B2
(45) Date of Patent: *May 5, 2026

(54) METHOD AND APPARATUS FOR COMPENSATING FOR ATMOSPHERIC DISTORTION

(71) Applicant: The United States of America, as represented by the Secretary of the Navy, San Diego, CA (US)

(72) Inventor: Kyle Robert Drexler, San Diego, CA (US)

(73) Assignee: United States of America as represented by the Secretary of the Navy, Washington, DC (US)

( * ) Notice: Subject to any disclaimer, the term of this patent is extended or adjusted under 35 U.S.C. 154(b) by 138 days.

This patent is subject to a terminal disclaimer.

(21) Appl. No.: 18/745,188

(22) Filed: Jun. 17, 2024

(65) Prior Publication Data

US 2024/0337855 A1 Oct. 10, 2024

Related U.S. Application Data

(62) Division of application No. 17/583,421, filed on Jan. 25, 2022, now Pat. No. 12,085,729.

(51) Int. Cl.
*G02B 27/42* (2006.01)
*G02B 27/00* (2006.01)

(52) U.S. Cl.
CPC ..... *G02B 27/4205* (2013.01); *G02B 27/0037* (2013.01)

(58) Field of Classification Search
CPC ............... G02B 27/4205; G02B 26/06; G02B 27/0025; G02B 27/0037; G02B 27/0068; G02B 27/48
See application file for complete search history.

(56) References Cited

U.S. PATENT DOCUMENTS

| | | | | |
|---|---|---|---|---|
| 5,418,632 A | * | 5/1995 | Anderson ............ | H04N 13/393 |
| | | | | 348/E13.056 |
| 6,466,372 B1 | * | 10/2002 | Morris ..................... | G03H 1/22 |
| | | | | 359/9 |
| 12,085,729 B2 | * | 9/2024 | Drexler .............. | G02B 27/4205 |
| 2010/0165301 A1 | * | 7/2010 | Kojima ................ | H04N 9/3155 |
| | | | | 353/38 |
| 2017/0052334 A1 | * | 2/2017 | Graves ............... | H04B 10/1123 |

* cited by examiner

*Primary Examiner* — Audrey Y Chang
(74) *Attorney, Agent, or Firm* — Naval Information Warfare Center Pacific; Kyle Eppele; J. Eric Anderson

(57) ABSTRACT

An atmospheric distortion compensator for a free space optical beam comprising: a disc that is rotationally balanced about a center point and that comprises a phase-modifying structure; an optical beam source configured to generate a free space optical beam that propagates through the disc and then through turbulence in open air to a point in space where reducing scintillation is desired, wherein the point in space is separated from the disc only by the open air; and a rotator mechanically coupled to the disc's center point and configured to spin the disc about an axis parallel to the free space optical beam, wherein the disc, when spinning, is configured to control a property of the free space optical beam thereby reducing scintillation effects as experienced at the point in space, which effects are caused by propagation of the free space optical beam through the open air.

19 Claims, 3 Drawing Sheets

METHOD AND APPARATUS FOR COMPENSATING FOR ATMOSPHERIC DISTORTION

CROSS-REFERENCE TO RELATED APPLICATION

This application is a divisional of prior U.S. Application No. 17/583,421, filed 25 Jan. 2022, titled "Atmospheric Compensation Disc"

FEDERALLY-SPONSORED RESEARCH AND DEVELOPMENT

The United States Government has ownership rights in this invention. Licensing and technical inquiries may be directed to the Office of Research and Technical Applications, Naval Information Warfare Center Pacific, Code 72120, San Diego, CA, 92152; voice (619) 553-5118; ssc_pac_t2@navy.mil.

BACKGROUND OF THE INVENTION

Adaptive optics systems that employ LASERs to create artificial guide stars are currently used to actively compensate for atmospheric turbulence. These adaptive optics systems contain imaging systems to measure these guide stars and then use deformable mirrors or spatial light modulators to apply a compensating spatial phase to the propagating light field to correct the atmospheric distortion. Traditional adaptive optics systems, while precise, are inherently expensive, large, complicated, and difficult to implement. There is a need for an improved atmospheric distortion compensator.

BRIEF DESCRIPTION OF THE DRAWINGS

Throughout the several views, like elements are referenced using like references. The elements in the figures are not drawn to scale and some dimensions are exaggerated for clarity.

DETAILED DESCRIPTION OF EMBODIMENTS

The disclosed apparatus below may be described generally, as well as in terms of specific examples and/or specific embodiments. For instances where references are made to detailed examples and/or embodiments, it should be appreciated that any of the underlying principles described are not to be limited to a single embodiment, but may be expanded for use with any of the other apparatus described herein as will be understood by one of ordinary skill in the art unless otherwise stated specifically.

References in the present disclosure to "one embodiment," "an embodiment," or any variation thereof, means that a particular element, feature, structure, or characteristic described in connection with the embodiments is included in at least one embodiment. The appearances of the phrases "in one embodiment," "in some embodiments," and "in other embodiments" in various places in the present disclosure are not necessarily all referring to the same embodiment or the same set of embodiments.

As used herein, the terms "comprises," "comprising," "includes," "including," "has," "having," or any variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or.

Additionally, use of words such as "the," "a," or "an" are employed to describe elements and components of the embodiments herein; this is done merely for grammatical reasons and to conform to idiomatic English. This detailed description should be read to include one or at least one, and the singular also includes the plural unless it is clearly indicated otherwise.

Figure 1:
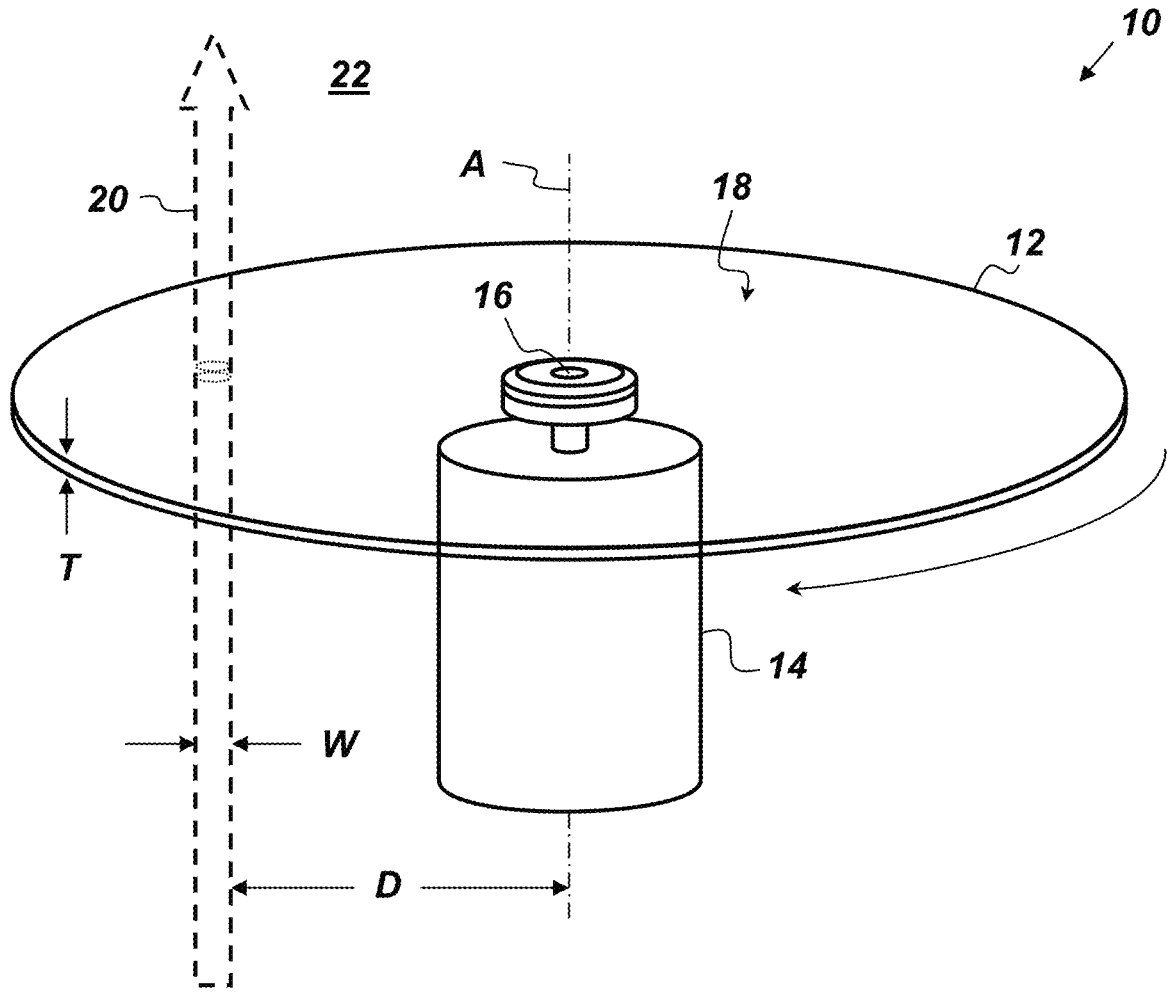
FIG. 1 is a perspective view of an embodiment of an atmospheric distortion compensator.

FIG. 1 is a perspective view illustration of an example embodiment of an atmospheric distortion compensator 10 (hereinafter referred to as compensator 10) that comprises, consists of, or consists essentially of a disc 12 and a rotator 14. The disc 12 is rotationally balanced about a center point 16 and comprises a phase-modifying structure on a surface 18. The rotator 14 is mechanically coupled to the disc's center point 16 and configured to spin the disc 12 about an axis A. The compensator 10 may be used to reduce scintillation effects within an electro-optical field of a heterogeneous medium 22, such as air, which effects are caused by a beam 20 as it propagates through the heterogeneous medium 22. The compensator 10 is configured such that the beam 20, while propagating parallel to the axis A, impinges on the disc 12 while the disc 12 is spinning, thereby allowing the compensator 10 to control a property of a beam 20 in an effort to reduce scintillation effects.

The beam 20 may be any free space optical beam. Suitable examples of the beam 20 include, but are not limited to, LASERs and Gaussian beams. In one example embodiment, the beam 20 is a fully coherent, monochromatic or narrow-band LASER. The compensator 10 can be applied to any application where reducing the scintillation at a point in space through turbulence is desired. Common examples would be illuminating an object at range, controlling a targeting beacon, or increasing the signal-to-noise ratio (SNR) of a free space optical communication link. When propagating a normal, fully coherent LASER source through a heterogeneous medium like the atmosphere, the beam 20 will not have the same spatial intensity distribution at range as it does in the transmit plane. The beam will have peaks and nulls due to the heterogeneous nature of the atmosphere. A common example is when looking at a star at night, it will twinkle. The compensator 10 may be used to reduce the twinkle of controlled optical beam sources.

The disc 12 may be made of any material capable of supporting the phase-modifying structure. Suitable examples include, but are not limited to, silicon dioxide (SiO2), crown glass, optical borosilicate-crown glass, and super-white soda-lime glass. For example, the Schott Company, of Mainz Germany produces several products from which the disc 12 may be manufactured including, but not limited to, the product B 270®, N-BK7, and N-K5. In one example embodiment, the disc 12 is a diffractive optical element made of optical grade glass and the phase-modifying structure comprises a pattern formed in the disc 12 that is controlled by a Gaussian-Schell model of partial coherence to control the propagating beam 20's spatial coherence property. Other types of patterns are realizable as well. For example, in one embodiment, the phase-modifying structure may be designed to control the propagating beam 20's optical orbital angular momentum. In one embodiment, the disc 12 is transmissive. In another embodiment, the disc 12 is reflective.

Figure 2:
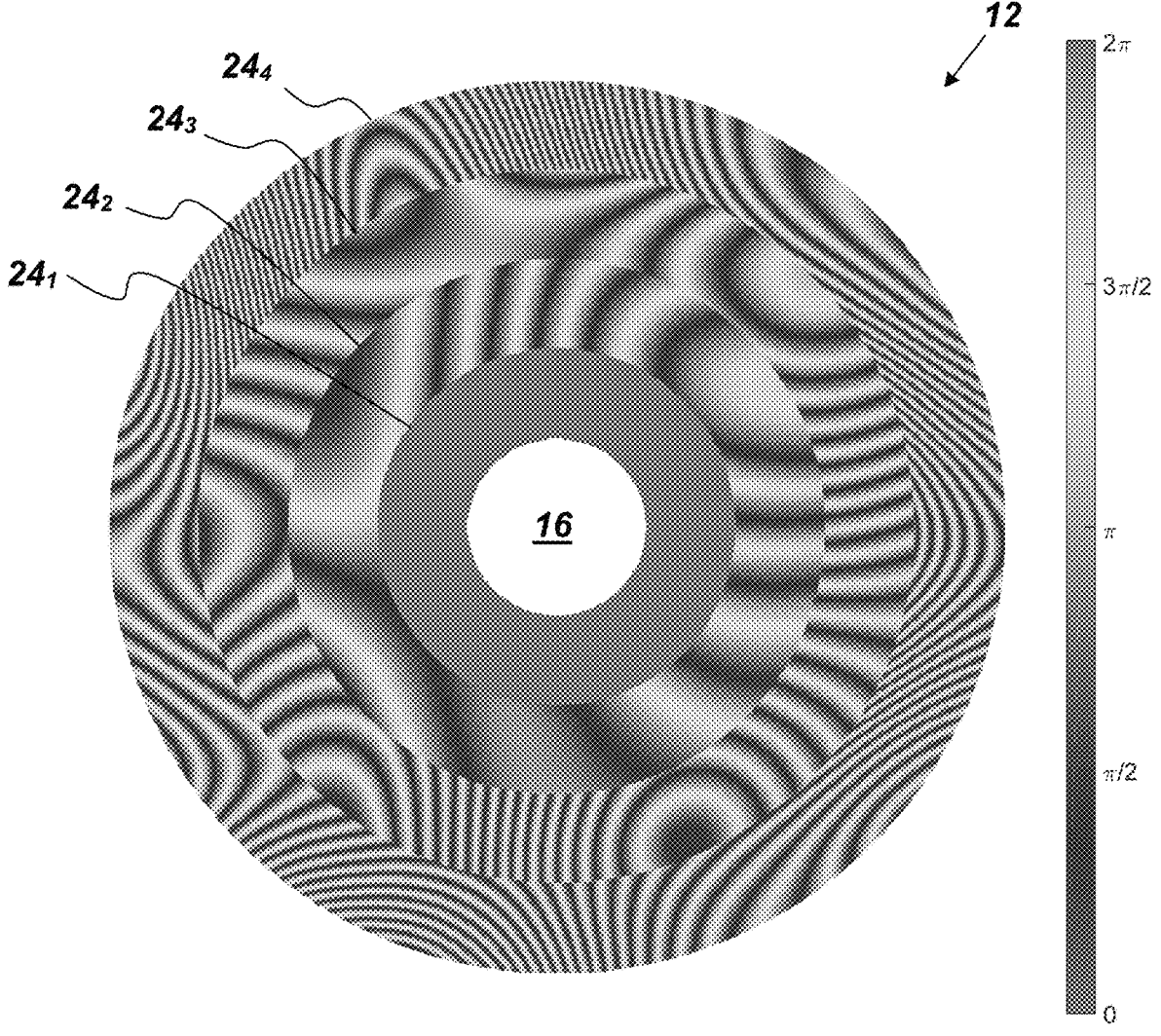
FIG. 2 is a front view illustration of an embodiment of a diffractive optical element disc.

FIG. 2 is a front view illustration, showing the surface 18, of an embodiment of the disc 12 having different tracks 24. In this embodiment, each track applies a different degree of partial coherence to the beam 20. The disc 12 may have any desired number of separate tracks. The number N of tracks that a disc 12 will have will be dependent on the desired application of the compensator 10 and will be heavily influenced by the amount of size, weight, and power that the compensator 10 is able to accommodate. The example embodiment of the disc 12 shown in FIG. 2 comprises four tracks ($24_1$, $24_2$, $24_3$, and $24_4$). Three of the tracks $24_2$, $24_3$, and $24_4$ are configured to change the phase of the beam 20 to control the partial coherence. Track $24_1$ is a reference track which may be used for alignment purposes and to enable the beam 20 to be fully coherent if desired. The reference track $24_1$ may be configured with a uniform phase profile to not distort the beam 20. The shadow gradations in FIG. 2 correspond to the phase of the propagating beam 20. Each track 24 is configured to apply a different degree of partial coherence to the beam 20. The tracks 24 are disposed on the disc 12 such that the beam 20 may be brought into contact with different tracks 24 by moving the disc 12 so as to change a distance D between the axis A and the beam 20 (See FIG. 1). The phase-modifying structures on the disc 12 may be realized by selectively varying the thickness T of the disc 12. In one example embodiment, the phase information in each track is converted to material thickness of the disc 12, which is entirely dependent on the disc 12's index of refraction, the index of refraction of the medium 22 the disc 12 is spinning in, and the wavelength of the beam 20. To physically create the varying thicknesses, one can use either subtraction or addition manufacturing techniques. For subtraction, the material could be polished, cut, etched, or vaporized out. Addition manufacturing techniques may utilize lithography techniques to mask and add material in controlled layers, or to utilize 3D printing technology to precisely place material in the necessary locations to build the phase modifying structures.

The rotator 14 may be any device capable of rotating the disc 12. Suitable examples of the rotator 14 include, but are not limited to, electric motors, DC-Brushless, stepper motors, AC motors, hand-powered crank, spring drives, water-wheels, and windmills. In one example embodiment, the rotator 14 is a computer-controlled, variable-speed, electric motor. The rate of rotation of the disc 12 may be altered depending on the desired application of the compensator 10. For example, for an imaging system application, the disc 12 may have a rotational spatial motion that is at least 30 times greater than the integration time of the imaging system. An example would be, for a one second integration, and a beam width W of 3 millimeters (mm), the disc 12 may have a spatial rotation motion of 90 mm, to achieve 30 independent realizations of a 3 mm beam. This motion would then need to be related to the track information, since each track has a different area and the rotation speed would need to be adjusted accordingly. To keep the math simple, for this example, if the entire track 24 is 90 mm long, then the disc 12 would need to rotate at 1 revolution per second for a 1 second integration system. If the total track 24 length was longer than 90 mm, then the disc 12 could rotate at less than 1 revolution per second, and if the overall track 24 was smaller than 90 mm, then the disc 12 would need to rotate faster than 1 revolution per second. Additionally, if the beam 20 is a pulsed LASER, the spin rate of the disc 12 may be tied to the repetition rate of the LASER to ensure independent phase realizations are being imparted on the propagating beam 20, rather than having the problem of getting stuck in frequency nodes between the spin rate of the disc 12 and the repetition rate of the LASER pulse. A classic common example of this problem is imaging airplane propellers that look stationary in the resulting image. This problem/effect should also be considered when establishing disc 12 rotation speeds and integration times of a camera in an imaging system application.

Figure 3:
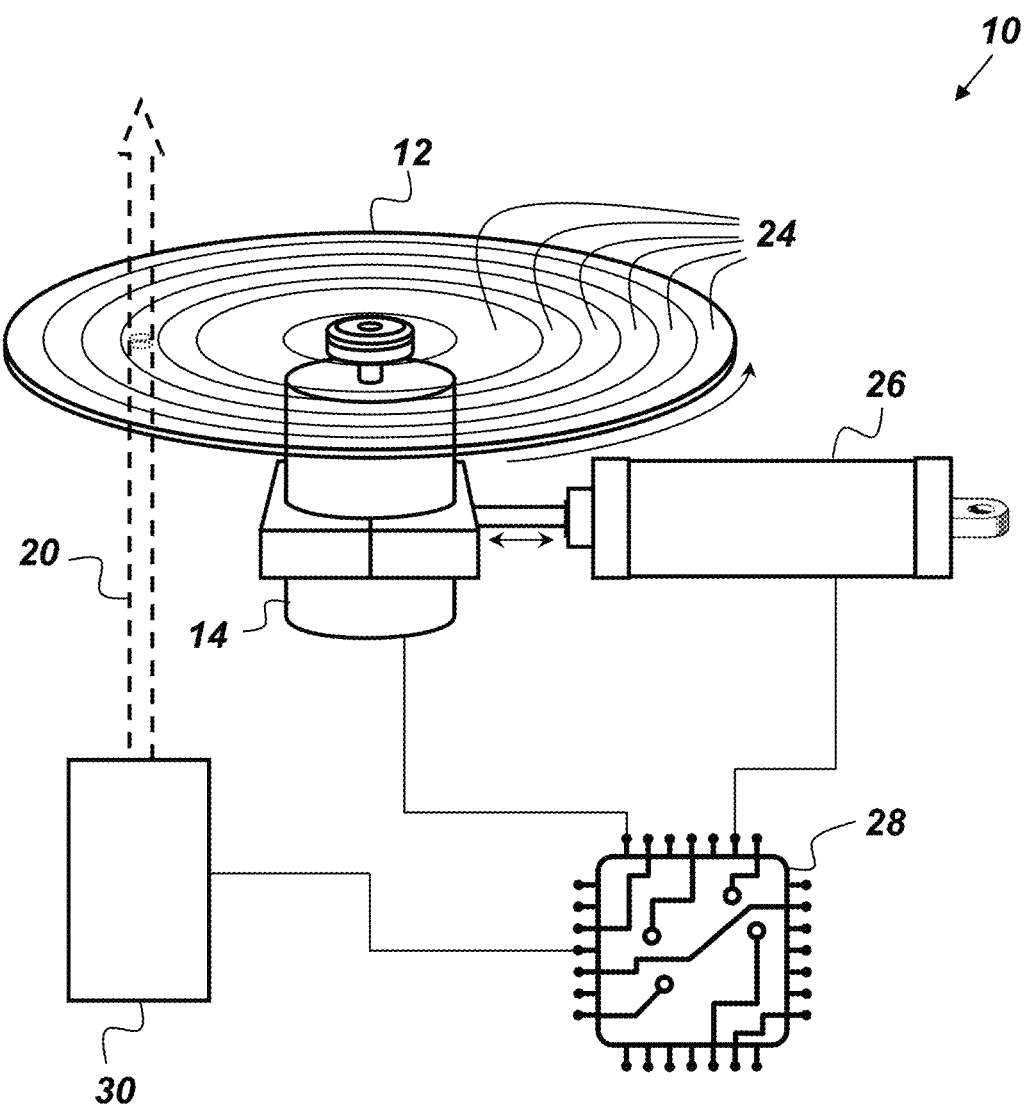
FIG. 3 is a perspective view of an embodiment of an atmospheric distortion compensator.

FIG. 3 is a perspective view of another example embodiment of the compensator 10. In this embodiment, the compensator 10 comprises a linear actuator 26 and a processor 28. The processor 28 is operatively coupled to the rotator 14 and configured to adjust a rotational speed of the disc 12. In this embodiment, the disc 12 comprises a plurality of N tracks 24, where each track 24 is configured to apply a different degree of partial coherence to the beam 20. The linear actuator 26 is configured to move the disc 12 in a direction that is orthogonal to the beam 20 such that the beam 20 may be brought into contact with any desired track 24. The linear actuator 26 may be communicatively coupled to the processor 28 thereby allowing the track 24 that is interacting with the beam 20 to be changed on the fly. The processor 28 may also be used to control a LASER source 30 and the linear actuator 26. In some embodiments, it may be desirable for the linear actuator 26 to move the LASER source 30 with respect to the disc 12.

The linear actuator 26 may be any device capable of moving the disc in a controlled manner in a direction orthogonal to the axis A. Suitable examples of the linear actuator 26 include, but are not limited to, a pneumatic piston, a hydraulic piston, a linear motor, an electro-mechanical cylinder, a screw-driven linear carriage, a timing-belt-driven carriage, a piezo-electric actuator, a rack-and-pinion driven actuator, a wheel-and-axle actuator, a cam actuator, and a solenoid. The processor 28 may be any computer or logic circuit capable of calculating the rotation speed of the disc 12 and position of the linear actuator 26 depending on the desired application of the compensator 10. Suitable examples of the processor 28 include, but are not limited to, General Purpose Input Output (GPIO) processors, Microcontrollers, Microprocessors, Embedded Processors, Digital Signal Processor (DSP), Media Processors, Application specific integrated circuits (ASICs), Application-Specific System Processors (ASSPs), Application-Specific Instruction Set Processors (ASIPs), Field Programmable Gate Arrays (FPGAs), and General Purpose Computers running Windows, Linux, or MacOS on x86 or x64 architectures.

The compensator 10 may be used to simply compensate for atmospheric distortion of a propagating optical signal. The compensator 10 may not be as precise as other, more expensive/comlex adaptive optics systems, but its use will still result in an increased signal to noise ratio (SNR) when compared to propagation without any compensation. This is because the SNR is computed by mean over noise, and if the noise term is significantly reduced with only moderate reductions to the power, the SNR of the entire system will increase.

From the above description of the compensator 10, it is manifest that various techniques may be used for implementing the concepts of the compensator 10 without departing from the scope of the claims. The described embodiments are to be considered in all respects as illustrative and not restrictive. The method/apparatus disclosed herein may be practiced in the absence of any element that is not specifically claimed and/or disclosed herein. It should also be understood that the compensator 10 is not limited to the particular embodiments described herein, but is capable of many embodiments without departing from the scope of the claims.

I claim:

1. An atmospheric distortion compensator for compensating for atmospheric distortion of a free space optical beam comprising:

a disc that is rotationally balanced about a center point and that comprises a phase-modifying structure;

an optical beam source configured to generate a free space optical beam that propagates through the disc and then through open air to a point in space where reducing scintillation caused by atmospheric turbulence is desired, wherein the point in space is separated from the disc only by the open air; and a rotator mechanically coupled to the disc's center point and configured to spin the disc about an axis parallel to the free space optical beam, wherein the disc, when spinning, is configured to control a property of the free space optical beam thereby reducing scintillation effects as experienced at the point in space, which effects are caused by propagation of the free space optical beam through the open air.

2. The atmospheric distortion compensator of claim 1, wherein the free space optical beam is a fully coherent, narrow-band LASER, and wherein the LASER has an at-disc spatial intensity distribution that differs from an at-range spatial intensity distribution at the point in space.

3. The atmospheric distortion compensator of claim 2, wherein the disc is a diffractive optical element.

4. The atmospheric distortion compensator of claim 3, wherein the phase-modifying structure comprises a pattern controlled by a Gaussian-Schell model of partial coherence to control the free space optical beam's spatial coherence property.

5. The atmospheric distortion compensator of claim 3, wherein the phase-modifying structure is designed to control the free space optical beam's optical orbital angular momentum.

6. The atmospheric distortion compensator of claim 4, wherein the disc further comprises a plurality of N tracks, wherein each track is configured to apply a different degree of partial coherence to the free space optical beam, and wherein the tracks are disposed on the disc such that the free space optical beam may be brought into contact with different tracks by moving the disc in a direction that is orthogonal to the free space optical beam.

7. The atmospheric distortion compensator of claim 6, wherein one of the tracks is a reference track, which is configured with a uniform phase profile that does not distort the free space optical beam.

8. The atmospheric distortion compensator of claim 7, further comprising a camera configured to capture an image of an object illuminated at range (that is, disposed at the point in space) by the free space optical beam, wherein the disc is spun at a rate that is at least 30 times greater than an integration time of the camera.

9. The atmospheric distortion compensator of claim 7, further comprising:

a processor operatively coupled to the rotator and configured to adjust a rotational speed of the disc;

a linear actuator communicatively coupled to the processor, wherein the rotator is mounted to the linear actuator, and wherein the linear actuator is configured to move the rotator such that the disc moves in a direction that is orthogonal to the axis, wherein the processor is configured to adjust a linear motion of the disc such that the LASER interacts with a desired track.

10. The atmospheric distortion compensator of claim 9, wherein the processor is configured to encode information on the LASER as part of a free space optical communication link.

11. The atmospheric distortion compensator of claim 1, wherein the disc further comprises at least two tracks that each comprise phase-modifying structures that differ from each other, and wherein the tracks are disposed on the disc such that the beam may be brought into contact with different tracks by moving the disc in a direction that is orthogonal to the free space optical beam.

12. A method for compensating for atmospheric distortion of a free space optical beam comprising:

generating the free space optical beam;

propagating the free space optical beam through a disc that is rotationally-balanced and that comprises a phase-modifying structure;

propagating the free space optical beam through open air so as to impinge on a point in space where reducing scintillation is desired after the free space optical beam has passed through the disc; and spinning the disc about an axis that is parallel to the free space optical beam so as to reduce, at the point in space, scintillation effects caused by propagation of the free space optical beam through atmospheric turbulence in the open air.

13. The method of claim 12, further comprising: illuminating an object located at the point in space with the free space optical beam.

14. The method of claim 13, further comprising: using a camera to capture an image of the object, wherein the disc, which is positioned between the camera and the object, is spun at a rate that is at least 30 times greater than an integration time of the camera.

15. The method of claim 12, further comprising applying the free space optical beam, after it has propagated through the disc and the open air, to controlling a targeting beacon disposed at the point in space.

16. The method of claim 12, further comprising controlling a targeting beacon disposed at the point in space with the free space optical beam after the free space optical beam has propagated through the disc and through atmospheric turbulence in the open air.

17. The method of claim 12, further comprising illuminating an object at range, wherein the object is disposed at the point in space, with the free space optical beam after the free space optical beam has propagated through the disc and through atmospheric turbulence in the open air.

18. A method for compensating for atmospheric distortion of a free space optical beam comprising:

generating the free space optical beam, wherein the free space optical beam is a free space optical communication signal, and wherein the free space optical beam is a pulsed LASER having a pulse repetition rate, and further comprising spinning the disc at a rate based on the LASER pulse repetition rate so as to impart independent phase realizations on the LASER so the spinning disc does not to get stuck in frequency nodes between the disc spin rate and the LASER pulse repetition rate;

propagating the free space optical beam through a disc that is rotationally-balanced and that comprises a phase-modifying structure and a plurality of N tracks, each track configured to apply a different degree of partial coherence to the free space optical beam;

propagating the free space optical beam through open air so as to impinge on a point in space where reducing scintillation is desired after the free space optical beam has passed through the disc;

spinning the disc about an axis that is parallel to the free space optical beam so as to reduce, at the point in space, scintillation effects caused by propagation of the free space optical beam through the open air;

adjusting a rotational speed of the disc with a processor operatively coupled to the rotator; and using a processor to instruct a linear actuator to move the disc in a direction that is orthogonal to the free space optical beam so as to bring the free space optical beam into contact with different tracks until a desired track is identified that increases a signal-to-noise ratio (SNR) of the free space optical communication signal as compared to a reference track that has a uniform phase profile.

19. The method of claim 18, further comprising using the processor to change, on the fly, the track that is in contact with the free space optical beam.

* * * * *